United States Patent [19]
Service

[11] Patent Number: 6,060,135
[45] Date of Patent: May 9, 2000

[54] LUSTROUS LAMINATE FILM STRUCTURES

[75] Inventor: Arnold Lewis Montgomery Service, East Amherst, N.Y.

[73] Assignee: E. I. du Pont de Nemours and Company, Wilmington, Del.

[21] Appl. No.: 08/944,661

[22] Filed: Oct. 6, 1997

Related U.S. Application Data

[60] Provisional application No. 60/027,514, Oct. 7, 1996.

[51] Int. Cl.$^7$ ..................................................... B60R 13/00
[52] U.S. Cl. ........................... 428/31; 428/421; 428/515; 428/212; 428/213; 428/332; 428/339; 428/422; 428/908.8; 264/299
[58] Field of Search ..................................... 428/421, 522, 428/422, 212, 339, 332, 213, 31, 420, 515, 908.8; 264/299, 336

[56] References Cited

U.S. PATENT DOCUMENTS

| | | | |
|---|---|---|---|
| 2,419,008 | 4/1947 | Coffman et al. | 260/88 |
| 2,510,783 | 6/1950 | Johnston et al. | 260/92.1 |
| 2,599,300 | 6/1952 | Upson | 260/94.9 |
| 2,953,818 | 9/1960 | Bartron . | |
| 3,087,827 | 4/1963 | Klenke et al. | 106/291 |
| 3,087,828 | 4/1963 | Linton et al. . | |
| 3,087,829 | 4/1963 | Linton | 106/291 |
| 3,139,470 | 6/1964 | Prengle et al. | 264/289 |
| 3,421,971 | 1/1969 | Kamal et al. | 161/184 |
| 3,734,807 | 5/1973 | Kelly et al. | 161/5 |
| 4,877,683 | 10/1989 | Bragaw et al. | 428/421 |
| 4,931,324 | 6/1990 | Ellison et al. | 428/31 |
| 5,342,666 | 8/1994 | Ellison et al. | 428/46 |
| 5,514,427 | 5/1996 | Ellison et al. | 428/31 |
| 5,536,539 | 7/1996 | Ellison et al. | 428/31 |
| 5,540,978 | 7/1996 | Schrenk | 428/212 |

*Primary Examiner*—Merrick Dixon

[57] ABSTRACT

A lustrous, high elongation fluoropolymer laminate film structure comprising a top layer of weatherable fluoropolymer film containing a nacreous pigment and an underlying polymer layer containing solid color pigment. The laminate construction maintains its uniform appearance when stretched allowing the film to be used in molding or thermoforming applications or similar processing applications.

12 Claims, No Drawings

LUSTROUS LAMINATE FILM STRUCTURES

RELATED APPLICATIONS

The present application claims benefit of U.S. Provisional Application No. 60/027,514, filed Oct. 7, 1996, pending.

FIELD OF INVENTION

The instant invention relates to weatherable fluoropolymer laminate film structures containing a nacreous pigment that have high elongations.

BACKGROUND OF THE INVENTION

Lustrous fluoropolymer films with a clear layer over a pigmented layer containing aluminum or mica flake have been disclosed for use as decorative surfacing films for the automotive industry in U.S. Pat. No. 4,810,540 (Ellison and Winton) and U.S. Pat. Nos. 5,536,539 and 5,514,427 (both to Ellison and Keith). However, the elongation of such films is typically less than the elongation of solid color films and their use can be undesirable or difficult in manufacturing operations causing elongation of the film, e.g., thermoforming or molding. In graphics marking films, the incorporation of metallic flake materials into the polymer matrix results in elongations significantly less than the same films with conventional pigments. Problems can result when such films are applied to substrates with non-uniform surfaces. In addition, known lustrous fluoropolymer films are not as resistant to weathering as is desired.

SUMMARY OF THE INVENTION

The instant invention solves problems associated with conventional films by providing a high-elongation, laminate film structure having a lustrous appearance which conforms easily to a non-uniform substrates while maintaining a uniform appearance. The instant invention also solves problems with conventional structures by providing a laminate film that maintains its appearance when thermoformed into a wide range of structures. Moreover, the lustrous laminate film structures have increased resistance to weathering compared to known films and have especially high gloss retention.

In accordance with the invention, a laminate film structure is provided comprising at least two polymer layers. The layers include a top layer of a weatherable fluoropolymer containing about 1 to about 15% by weight nacreous pigment based on the total dry weight of fluoropolymer and pigment. The top layer has a thickness of about 4 $\mu$m to about 15 $\mu$m. The structure also has an underlying layer of a polymer containing about 1 to about 20% by weight solid color pigment based on the total dry weight of polymer and pigment. The thickness of the underlying layer is at least two times as thick as the top layer. The laminate film structure has a room temperature elongation greater than 100%.

In accordance with a preferred aspect of the invention, the polymer of the underlying layer comprises a fluoropolymer.

In accordance with another preferred aspect of the invention, the laminate film structure retains at least 50% of its 60 degree gloss after 6000 kJ exposure in an accelerated weathering device operated in accordance with SAE J1960.

In accordance with a preferred form of the invention, the laminate film is adhered to a thermoplastic sheet material suitable for thermoforming. Preferably, shaped articles of such material have 60 degree gloss greater than 70 and a DOI greater than 40.

A process for making a laminate film structure in accordance with the invention includes the steps of:

a) preparing a first fluid composition of fluoropolymer resin containing from about 0.2 to about 6.5% nacreous pigment based on the weight of the fluid composition,
b) casting the first fluoropolymer fluid composition onto a support substrate;
c) forming a coalesced first fluoropolymer film layer on the support substrate having a thickness of about 4 $\mu$m to about 15 $\mu$m;
d) drying a coalesced first fluoropolymer film layer on the support substrate;
e) preparing a second fluid composition of polymer resin containing from about 0.5 to about 10% solid color pigment based on the weight of the fluid composition;
f) casting the second polymer fluid composition onto the first coalesced fluoropolymer film layer;
g) forming a coalesced second polymer film on the first fluoropolymer layer to form a laminate film structure which second layer is at least two times as thick as the first layer;
h) drying the laminate film structure while in contact with the support substrate; and
i) removing the laminate film structure having a lustrous appearance on the support side from the support substrate.

DETAILED DESCRIPTION

It has been discovered that a lustrous laminate film structure having high elongation can be achieved by the instant invention. The laminate structure comprises a top layer of fluoropolymer film which incorporates nacreous pigment and at least one underlying layer of polymer film containing solid color pigment. In accordance with the invention, ranges of nacreous pigment and the ratio of thicknesses of the two layers has been are employed so that room temperature elongation values of greater than 100% are achieved. This elongation value permits production of laminate structures which maintain a uniform appearance after subsequent processing steps such as molding, thermoforming, stretching and other similar processing applications. Films with elongation values of greater than 100% exhibit greater conformity when applying them to nonuniform substrates. Such films easily to conform around bolts, fasteners and the like which may be present on display surfaces such as truck panels. Film laminate structures of this invention conform to display surfaces minimizing air pockets and other defects. Improved visual aesthetics and improved adhesion are evident when high elongation film structures of this invention are used for graphic applications. Nacreous pigment creates lustrous films whose aesthetics are desirable as trim or exterior fascia for many automotive, recreational vehicles, and for numerous graphic applications among many other uses.

To better understand a description of this invention the following terms are herein defined:

By uniform is meant the consistency of appearance (e.g., gloss or color) to an observer at any viewing angle with no apparent anomalies.

Gloss refers to specular gloss and is defined as the ratio of flux reflected in specular direction to incident flux for a specified angle of incidence and source and receptor angular apertures (ASTM E284).

Gloss measurement scale is a system of specifying numerically the perceived gloss of an object (The Measurement of Appearance, Richard S. Hunter 1975).

By DOI (Distinctness of Image) is meant an aspect of gloss characterized by the sharpness of objects produced by reflection at a surface (ASTM E284).

By lustrous is meant the appearance characteristic of a surface that reflects more in some directions than it does in other directions, but not of such gloss as to form clear mirror images (ASTM E284). The term gonioapparent has also been used used to refer this appearance property of a surface.

The present invention is applicable to a wide range of weatherable polymers. The top layer of the film laminate sturcture comprisies weatherable fluoropolymers such as those prepared from polymers and copolymers of trifluoroethylene, hexafluoropropylene, monochlorotrifluoroethylene, dichlorodifluoroethylene, tetrafluoroethylene, vinylidene fluoride, vinyl fluoride, among others. Specifically, the fluoropolymer may be a fluorinated ethylene/propylene copolymer, e.g., FEP resins, a copolymer of ethylene/chlorotrifluoroethylene, vinylidene fluoride/hexafluoropropylene and vinylidene fluoride/perfluoro (alkyl vinyl ether) dipolymers and terpolymers with tetrafluoroethylene, among others. While any suitable fluoropolymer film can be employed, the present invention is particularly suited to unoriented films of polyvinylidene fluoride (PVDF), alloys of acrylic and PVDF, and especially, to polyvinyl fluoride (PVF), the nature and preparation of which are described in detail below.

The underlying layer of the film laminate sturcture comprises weatherable polymers including acrylate polymers, urethane polymers and fluoropolymers. A description of such polymers can be found in U.S. Pat. Nos. 4,931,324 and 5,536,539. Preferably, the polymer of the underlying layer is a fluoropolymer such as those described above for the top layer of the laminate structure. Each layer may be the same fluoropolymer film composition or may be different fluoropolymer compositions. Most preferably, the polymer is polyvinyl fluoride.

The fluoropolymer films can be made from fluid compositions which are either (1) solutions or (2) dispersions of fluoropolymer. Typical solutions are those prepared from polyvinylidene fluoride or copolymers of vinylidene fluoride and solvents which have boiling points high enough to avoid bubble formation during the solution casting/drying process. The polymer concentration in these solutions is adjusted to achieve a workable viscosity of the solution and in general is less than about 25% by weight of the solution.

The present invention is particularly suited to films of polyvinyl fluoride (PVF) which are prepared from dispersions of the fluoropolymer, the nature and preparation of which are described in detail in U.S. Pat. Nos. 4,877,683; 3,139,470; 2,953,818; 2,419,008; 2,510,783; and 2,599,300, all of which are hereby incorporated by reference.

Fluoropolymer films of this invention may be prepared from a dispersion, for example, PVF in propylene carbonate, N-methyl pyrrolidone, γ-butyrolactone, sulfolane, and dimethyl acetamide. The PVF and, optionally one or more dispersants and/or pigments are generally first milled together. A wide variety of mills can be used for the preparation of the dispersion. Typically, the mill employs a dense agitated grinding medium, such as sand, steel shot, glass beads, ceramic shot, Zirconia, or pebbles, as in a ball mill, an ATTRITOR® available from Union Process, Akron, Ohio, or an agitated media mill such as a "Netzsch" mill available from Netzsch, Inc., Exton, Pa. The dispersion is milled for a time sufficient to cause deagglomeration of the PVF. Typical residence time of the dispersion in a Netzsch mill ranges from thirty seconds up to ten minutes.

The concentration of PVF in the dispersion will vary with the particular polymer and the process equipment and the conditions used. In general, the fluoropolymer will comprise about from 30 to about 45% by weight of the dispersion.

The first or top fluoropolymer film layer is made from a first fluid composition of fluoropolymer (which may be either a solution or dispersion) and contains about 0.5 to about 6.5% by weight of the fluid composition of nacreous pigment, resulting in a dry film of from about 1 to about 15% by weight of nacreous pigment in polymer. Preferably, the top layer contains about 1 to about 5% by weight nacreous pigment based on the total dry weight of fluoropolymer and pigment. The nacreous pigment containing layer has a typical thickness of about 4 $\mu$m and about 15 $\mu$m, preferably between about 5 $\mu$m to about 10 $\mu$m.

The nacreous pigment dispersion is typically prepared by mixing the nacreous pigment with a polyvinyl fluoride/propylene carbonate mixture using a propeller, spatula, or other low energy intensive mixing device. Optionally, solid color pigments which have been previously dispersed using dense agitated medium such as sand, steel shot, or pebbles as in a ball mill, an attritor, or a Netzsch mill can be added to the nacreous pigment/polyvinyl fluoride/propylene carbonate mixture. Pigments that can be used in combination with the pearlescent pigments include such pigments as titanium dioxide, carbon black, copper pthalocyanine, quinacridone, perylene, iron oxide, mixtures thereof, among others.

By nacreous pigment is meant mica particles, and mica particles coated with pigment. Nacreous pigment is also known as pearlescent pigments. Such particles give a lustrous appearance to the films in which they are incorporated. These particles have an average longest dimension of about 10 to about 200 $\mu$m, normally about 15 to about 50 $\mu$m, with no more than about 50% of the particles of flake having longest dimensions of more than about 500 $\mu$m. The mica particles coated with pigment are those described in U.S. Pat. Nos. 3,087,827 (Klenke and Stratton); 3,087,828 (Linton); and 3,087,829 (Linton). The micas described in these patents are coated with oxides or hydrous oxides of titanium, zirconium, aluminum, zinc, antimony, tin, iron, copper, nickel, cobalt, chromium, vanadium, mixtures thereof, among others. Titanium dioxide coated mica is especially useful because of its availability.

By solid color pigment is meant a pigment which when mixed with polymer produces a solid color layer which is not lustrous. Suitable pigments include carbon black, titanium dioxide, iron oxide, nickel titanate, quinacridone, copper phthalocyanine, cobalt aluminate, mixtures thereof, among others.

The second or underlying polymer film layer may be made from a second fluid composition of fluoropolymer or other polymer (which may be either a solution or dispersion) and contains about 0.5 to about 10% by weight of the fluid composition of solid color pigment, resulting in a dry film of from about 1 to about 20% by weight of solid color pigment in polymer. The dispersion used in forming the second or underlying layer may contain the same fluoropolymer that forms the first layer or may be a different fluoropolymer. Polymers other than fluoropolymers which may be suitable for the second layer of this invention include acrylate polymers, vinyl polymers, urethane polymers and blends thereof. The second layer is at least two times as thick as the first layer and the total film thickness of the laminate film structure comprising at least two layers is not less than about 30 $\mu$m. Suitable solid color pigments for use in the underlying layer include carbon black, titanium dioxide, iron oxide, nickel titanate, quinacridone, copper phthalocyanine, and cobalt aluminate.

The top layer of fluoropolymer film is formed into its desired configuration by casting the dispersion onto a support substrate, using any conventional means, such as spray, roll, knife, curtain, gravure coaters, or any other method that permits the application of a uniform film without streaks or other defects. The thickness of the first layer of cast dispersion is generally about 4 μm and about 15 μm, preferably between about 5 μm to about 10 μm.

A wide variety of support substrates can be used for forming films according to the present invention, depending on the particular polymer and the coalescing conditions. The surface onto which the dispersion is cast should be selected to provide easy removal of the finished film after it is coalesced. Polymeric films, glass or steel belts can, for example, be used. Polymeric films which may be used include films of polyimides, polyarylates, and polyesters. Polyester films, such as oriented polyethylene terephthalate films, have been found to provide particularly good performance in the production of fluoropolymer films with excellent surface characteristics.

The first fluoropolymer dispersion containing nacreous pigment is cast onto the coated support substrate and heated to coalesce the fluoropolymer into a film that forms a first layer. The conditions used to coalesce the polymer will vary with the polymer used, the thickness of the cast dispersion, and other operating conditions. However, typically, for PVF, oven temperatures of about from 340° F. (171° C.) to about 480° F. (249° C.) can be used to coalesce the film, and temperatures of about 380° (193° C.) to about 450° F. (232° C.) have been found to be particularly satisfactory. The oven air temperatures, of course, are not representative of the temperatures of the polymeric film, which will be lower. It is desirable to dry the first layer sufficiently before the application of the second layer of dispersion and thereby providing a flat support for the second layer.

The second fluoropolymer dispersion containing solid color pigment is cast onto the first fluoropolymer layer and heated to coalesce the fluoropolymer into a film that forms a second layer adjacent to and laminated to the first layer.

The conditions used to coalesce the polymer will vary with the polymer used, the thickness of the cast dispersion, and other operating conditions. However, typically, for PVF, oven temperatures of about from about 340° F. (171° C.) to about 480° F. (249° C.) can be used to coalesce the film, and temperatures of about 380° F. (193° C.) to about 450° F. (232° C.) have been found to be particularly satisfactory. The oven air temperatures, of course, are not representative of the temperatures of the polymeric film, which will be lower. After coalescence, the air side of the film is optionally treated using conventional corona, chemical, or flame methods to create a compatible surface for an adhesive. After such treatment, an adhesive is optionally applied. A finished laminate film structure of uniform and lustrous appearance is stripped from the support substrate according to usual techniques.

Laminate film structure in accordance with the invention with high room temperature elongation properties may be further processed or shaped using standard forming or molding techniques, including the application of heat, without suffering the loss of its aesthetic properties. By means of example, the laminate film structure may be adhered to a thermoplastic sheet material such as acrylonitrile-butadiene-styrene, thermoplastic olefins, thermoplastic urethanes, polyvinyl chloride, acrylics, among others.

An article of uniform appearance having a 60 degree gloss greater than 70 and a DOI greater than 40 may then be produced by thermoforming a construction of thermoplastic sheet material adhered to a laminate film structure in accordance with the invention.

It has been unexpectedly found by means of this invention that thermoformed shapes thus formed retain and exhibit high gloss and good DOI despite the mechanical deformation experienced during thermoforming or other types of molding processes. Fluoropolymer film laminate structures of the present invention, and in particular polyvinyl fluoride, is noted for its attractiveness and possesses an unusual combination of excellent resistance to outdoor weathering exposures, a high degree of physical toughness, chemical inertness, abrasion resistance, resistance to soiling and the action of solvents as well as an significant retention of these properties at both low and elevated temperatures. The foregoing list of properties not only suggests many areas for use for of these laminate film structures as either self supporting as formed or as the outer layer of a wide variety of laminar constructions wherein PVF films serve to upgrade less functional base layers.

The laminate film structures described in this invention have particular application as plastic laminate constructions wherein a metallic-looking appearance is desired such as for automotive vehicles, watercraft, recreational vehicles, and vehicle striping. Applications such as these are naturally exposed to weather extremes. Preferred films in accordance with the invention have exceptional gloss retention and retain at least 50% of its 60 degree gloss after 6000 kJ exposure in an accelerated weathering device operated in accordance with SAE J1960 and are extremely well suited for such uses. Known fluoropolymer film structures such as those containing aluminum flake are not as resistance to weathering.

Use of the invention avoids the known problems of aluminum flake paints which contain solvents that must be handled by a manufacturer. Films described in this invention can eliminate the handling of such solvents and their undesirable emissions while providing aesthetics similar to those achieved with paint coatings.

Lustrous color, relatively high DOI and gloss creates an eye-catching appearance that is highly desirable for highlighting the contours and features of recreational vehicles. For industrial equipment, the laminate structures of the present invention provide paint like surfaces possessing the characteristics of fluoropolymer films to withstand harsh environments and maintain appearance over prolonged periods of severe use.

TEST METHODS

Elongation of laminate samples was tested by following the procedures described in ASTM D882 using a tensile machine produced by Instron of Canton, Mass. using a load of 20 kilograms and a face speed of 2 inches (5.08 centimeters) per minute.

DOI (Distinctness of Image) DOI of laminate film construction formed from laminate films adhered to ABS (acrylic-butadiene-styrene) sheet was measured using the customer directions for a DOI measurement instrument 1864 SQC produced by ATI of Madison Heights, Mich.

Gloss of the laminate film construction formed from laminate films adhered to ABS sheet was measured in accordance with ASTM D523 using a MICRO-TRIGLOSS gloss measurement instrument distributed by Paul N. Gardner Company, Pompano Beach, Fla.

Accelerated weathering performance of the laminate film structures was determined in accordance with SAE J1960 using a xenon arc accelerated weathering apparatus available form the Atlas Company, Chicago, Ill.

EXAMPLES

To demonstrate these effects, coating materials were made and tested. Parts, proportions and percentages herein are by weight except where otherwise indicated.

Example 1

A two layer film laminate structure exemplifying the present invention was made and adhered to a thermoplastic sheet and then thermoformed.

First Layer: A first layer containing 1% by weight nacreous pigment based on the total dry weight of the fluoropolymer and pigment was prepared using the following procedure.

A blue pigment dispersion of copper phthalocyanine pigment, available as Irgazin Blue 3627 from Ciba Pigments, in N-methyl pyrrolidone was prepared in the proportions shown below in Table 1. A dispersion of 40 weight % PVF and propylene carbonate was prepared. A blue pearl mixture of PVF/propylene carbonate, copper phthalocyanine pigment and nacreous pigment, available as Silver 139Z from Mearl Corporation of New York, was prepared in the proportions shown in Table 1 using a propeller type mixer to provide a homogeneous mixture. Propylene carbonate was added to the blue pearl mixture to provide lower coating viscosity to aid in coating. The blue pearl mixture was cast onto a glossy polyester film support substrate, available as Melinex 442 manufactured by ICI, by use of a gravure coater. The coating was dried in a three-zone air-float oven with temperatures ranging between 410° F. (210° C.) and 340° F. (171° C.) for 36 seconds. The dry film was approximately 0.25 mils (6.35 um) thick.

TABLE 1

| | wt. % |
|---|---|
| Blue Pigment Dispersion | |
| Irgazin Blue 3627 | 7.8 |
| Disperbyk 160 | 1.5 |
| (supplied by Byk/Chemis Wallingford, CT) | |
| N-methyl pyrrolidone | 90.7 |
| Blue Pearl Mixture | |
| Irgazin Blue 3627 | 14.74 |
| Propylene carbonate/PVF mix | 71.70 |
| Silver Pearl 139Z | 0.29 |
| Propylene carbonate | 13.27 |

Second Layer: A second layer containing 3% by weight solid color pigment based on the total dry weight of fluoropolymer and pigment was prepared using the following procedure.

A black dispersion was created by first grinding carbon black pigment, available as Raven 16 from by Columbian Chemical Co of Atlanta, Ga., with dispersant available as Disperbyk 160 from Byk/Chemie and N-methyl pyrrolidone in a Netzsch mill. The black dispersion was then added to a 40 weight % PVF and propylene carbonate dispersion to form a black coating mixture by mixing in a high-speed disperser from Scharr Co. The compositions of the black dispersion and black coating mixture are shown below in Table 2.

TABLE 2

| | wt. % |
|---|---|
| Black Dispersion | |
| Raven 16 | 15.0 |
| PVF | 8.7 |
| Disperbyk 160 | 6.2 |
| N-methyl pyrrolidone | 70.1 |

TABLE 2-continued

| | wt. % |
|---|---|
| Black Coating Mixture | |
| Propylene carbonate/PVF mix | 92.59 |
| Raven 16 black dispersion | 7.41 |

The black coating mixture was cast onto the nacreous pigment film using a gravure coating method. The film was dried using a three-zone oven with temperatures ranging from 330° F. (166° C.) to 400° F. (204° C.) for 45 seconds. The total film thickness of both layers was approximately 1.5 mils (38.1 um) thick.

The fluoropolymer laminate film structure was stripped from the web by hand and tested on a tensile machine produced by Instron of Canton, Mass. per ASTM D882 using a load of 20 kilograms and a face speed of 2 inches (5.08 centimeters) per minute. The average elongation of three samples stretched in the machine casting direction was 131% and the average of three samples stretched in the transverse casting direction was 125%.

The fluoropolymer laminate film structure was treated on the air side (e.g., the side formed away from the casting support substrate) using a Tesla coil from Electro Technic of Chicago, Ill. This corona treatment involved passing the coil less than 6 inches (15.24 centimeters) from the air side of the film thereby providing a surface which promotes adhesion when further coated or laminated. The fluoropolymer laminate film structure was subsequently coated on the black film side (or air side) with an acrylic adhesive available as product number 68080 from the DuPont Company using a draw down bar available from Paul N. Gardner Co.

After air drying, a laminate construction was formed by pressing the laminate film pressed onto a 0.150 inch 3.81 millimeters) ABS (acrylic-butadiene-styrene) sheet, available from Portage Industries of Portage, Wis., using 2.5 tons of pressure held at 330° F. (193° C.) for 5 minutes. The press is produced by Wabash of Wabash, Ind.

DOI of the resulting laminate construction was measured using the customer directions for a DOI measurement instrument produced by ATI of Madison Heights, Mich. DOI measurements ranging between 67 and 87 were obtained. Specular gloss was determined to be 84 at 60 degrees.

The ABS laminate construction was then thermoformed using a Drypol theroformer at approximately 380° F. (193° C.), cooled and measured for DOI. The formed article had a DOI of 41.

Comparison Example A

LOW DOI of Thermoformed Article

For comparison, a two layer film laminate structure lacking the elements of the present invention was made and adhered to a thermoplastic sheet and then thermoformed. Total film thickness was low and produced articles of low DOI.

First Layer: A first layer containing 3.5% by weight nacreous pigment based on the total dry weight of fluoropolymer and pigment was prepared using the following procedure.

A green pigment dispersion of copper phthalocyanine green pigment, available as Monolite Green 751 from Zeneca of Wilmington, Del., in N-methyl pyrrolidone was prepared in the proportions shown in Table 3. Dispersant polyvinyl pyrrolidone K-15 available From GAF Chemicals of Wayne, N.J. was used. A dispersion of 40 weight % PVF and propylene carbonate was prepared. A green pearl mixture of PVF/propylene carbonate, copper phthalocyanine green pigment and nacreous pigment, available as Sparkle139P from Mearl Corporation of New York, was prepared in the proportions shown below in Table 3 using a propeller type mixer to provide a homogeneous mixture. The green pearl mixture was cast onto a glossy polyester film support substrate, available as Melinex 442 manufactured by ICI, by use of a gravure coater. The coating was dried in a three-zone air-float oven with temperatures ranging between 410° F. (210° C.) and 340° F. (171° C.) for 36 seconds. The dry film was approximately 0.25 mils (6.35 um) thick.

TABLE 3

|  | wt. % |
| --- | --- |
| Green Dispersion | |
| Monolite Green 751 | 20.0 |
| Polyvinylpyrrolidone K-15 | 2.0 |
| N-methyl pyrrolidone | 78.0 |
| Green Pearl Mixture | |
| Monolite Green 751 dispersion | 2.87 |
| Propylene carbonate/PVF mix | 95.79 |
| Sparkle Pearl 139P | 1.34 |

Second Layer: A second layer containing 12% by weight solid color pigment based on the total dry weight of fluoropolymer and pigment was prepared using the following procedure.

A white dispersion was created by first grinding titanium dioxide pigment available as R-960 supplied by the DuPont Company with dispersants, polyvinyl fluoride and propylene carbonate in a high-speed disperser. The white dispersion was then added to a polyvinyl fluoride and propylene carbonate dispersion that was mixed in a high-speed disperser from Scharr Co. The compositions of the white dispersion, polyvinyl fluoride dispersion and subsequent coating are shown below in Table 4.

TABLE 4

|  | wt. % |
| --- | --- |
| White Dispersion | |
| Pigment | 11.7 |
| PVF | 34.8 |
| Disperbyk 160 | 1.7 |
| Propylene carbonate | 51.8 |
| White mixture coating | |
| propylene carbonate/PVF mix | 57.05 |
| white dispersion | 42.95 |

The white coating was cast onto the nacreous pigment layer using a gravure coating method. The film was dried using a three-zone oven with temperatures ranging from 330° F. (166° C.) to 400° F. (204° C.) for 45 seconds. The total film thickness of both layers was approximately 0.9 mils (22.86 um) thick.

The fluoropolymer film was stripped from the web by hand and tested on a tensile machine produced by Instron of Canton, Mass. using a load of 20 kilograms and a face speed of 2 inches (5.08 cm) per minute. The average of three samples, stretched in the machine casting direction was 155% and the average of three samples stretched in the transverse casting direction was 186%.

After hand treating the air side with a Tesla coil from Electro Technic Products of Chicago, Ill., the fluoropolymer film was coated on the white film side with an acrylic adhesive 68080 produced by The DuPont Company using a draw down bar available from Paul N. Gardner Co. After air drying, the film was pressed onto a 0.150 inch (381 cm) ABS sheet using 2.5 tons of pressure held at 330° F. (166° C.) for 5 minutes. The press is produced by Wabash of Wabash, Ind.

The ABS sheet was thermoformed using a Drypol thermoformer at approximately 380° F. (193° C.), cooled and found to have a DOI of 33. The sheet also was non-uniform in color and appearance. The sheet had areas where no visible signs of lustrous material was apparent.

Comparison Example B

Poor Elongation

A two layer film laminate structure lacking the elements of the present was made and tested for elongation. High nacreous pigment content produced film laminates with poor elongation.

First Layer: A first layer containing 17.5% by weight nacreous pigment based on the total weight of fluoropolymer and pigment was prepared using the following procedure.

A silver pearl pigment dispersion was prepared in a dispersion by combining 93.37% of a 40% weight polyvinyl fluoride and propylene carbonate dispersion with 6.63% by weight Silver 139Z produced by Mearl Corp. of New York, N.Y. using a propeller to produce a uniform mixture. This mixture was cast onto a glossy polyester film supplied by ICI Co. and known as Melinex 442 by use of a gravure coater. The coating was dried in a three-zone air-float oven with temperatures ranging between 410° F. (210° C.) and 340° F. (171°) for 36 seconds. The dry film was approximately 0.25 mils (6.35 um) thick.

TABLE 5

| Pearl Mixture | wt. % |
| --- | --- |
| Propylene Carbonate/PVF Mix | 93.37 |
| SILVER 139Z | 6.63 |

Second Layer: A second layer containing 15% by weight solid color pigment based on the total dry weight of fluoropolymer and pigment was prepared using the following procedure.

A gray coating mixture was created by first forming a white dispersion by grinding titanium dioxide pigment, available as R-960 manufactured by the DuPont Company of Wilmington, Del., with dispersants, polyvinyl fluoride and propylene carbonate in a high-speed disperser. A black dispersion was then formed by grinding carbon black pigment available as Raven 16 manufactured by Columbian Chemical Co of Atlanta, Ga. with dispersants and N-methyl pyrrolidone in a Netzsch mill. The white and black dispersions were then added to a polyvinyl fluoride and propylene carbonate dispersion created with a high-speed disperser; the three mixtures were combined using a propeller to provide a uniform color. The compositions of the white dispersion, black dispersion and gray mixture coating are shown below in Table 6.

TABLE 6

| | wt. % |
|---|---|
| White Dispersion | |
| Pigment | 11.7 |
| PVF | 34.8 |
| Disperbyk 160 | 1.7 |
| Propylene carbonate | 51.8 |
| Black Dispersion | |
| Pigment | 15.0 |
| PVF | 8.7 |
| Dispersant | 6.2 |
| N-methyl pyrrolidone | 70.1 |
| Gray Coating Mixture | |
| propylene carbonate/PVF mix | 47.86 |
| R-960 white dispersion | 43.63 |
| Raven 16 black dispersion | 8.51 |

The gray coating mixture was cast onto the nacreous pigment film using a gravure coating method. The film was dried using a three-zone oven with temperatures ranging from 330° F. (166° C.) to 400° F. (204° C.) for 45 seconds. The total film thickness of both layers was approximately 1.2 mils (30.48 um) thick.

The fluoropolymer film was stripped from the web by hand and tested on a tensile machine produced by Instron of Canton, Mass. using a load of 20 kilograms and a face speed of 2 inches (5.08 cm) per minute. The average of three samples stretched in the machine casting direction was 73% and the average of three samples stretched in the transverse casting direction was 51%.

Example 2

Weathering Comparisons

Weathering performance of a film laminate structures made by this invention Example 2A) was compared to a film laminate structure which contains aluminum flake (Example 2B) and to a commercially available graphics film (Example 2C).

Example 2A

A two layer film laminate structure according to this invention was made and tested for weathering resistance.

First Layer: A first layer containing 12% by weight nacreous pigment based on the total weight of fluoropolymer and pigment was prepared using the following procedure.

A silver pearl pigment dispersion was prepared in a dispersion by combining 94.83% of a 40% weight polyvinyl fluoride and propylene carbonate dispersion with 5.17% by weight Silver 139Z produced by Mearl Corp. of New York, N.Y. using a propeller to produce a uniform mixture. This mixture was cast onto a glossy polyester film supplied by ICI Co. and known as Melinex 442 by use of a gravure coater. The coating was dried in a three-zone air-float oven with temperatures ranging between 410° F. (210° C.) and 340° F. (171°) for 36 seconds. The dry film was approximately 0.25 mils (6.35 um) thick.

TABLE 7

| Pearl Mixture | wt. % |
|---|---|
| Propylene Carbonate/PVF Mix | 94.83 |
| SILVER 139Z | 5.17 |

Second Layer: A second layer containing 7.7% by weight solid color pigment based on the total dry weight of fluoropolymer and pigment was prepared using the following procedure.

A gray coating mixture was created by first forming a white dispersion by grinding titanium dioxide pigment, available as R-960 manufactured by the DuPont Company of Wilmington, Del., with dispersants, polyvinyl fluoride and propylene carbonate in a high-speed disperser. A black dispersion was then formed by grinding carbon black pigment available as Raven 16 manufactured by Columbian Chemical Co of Atlanta, Ga. with dispersants and N-methyl pyrrolidone in a Netzsch mill. The white and black dispersions were then added to a polyvinyl fluoride and propylene carbonate dispersion created with a high-speed disperser; the three mixtures were combined using a propeller to provide a uniform color. The compositions of the white dispersion, black dispersion and gray mixture coating are shown below in Table 8.

TABLE 8

| | wt. % |
|---|---|
| White Dispersion | |
| Pigment | 11.7 |
| PVF | 34.8 |
| Disperbyk 160 | 1.7 |
| Propylene carbonate | 51.8 |
| Black Dispersion | |
| Pigment | 15.0 |
| PVF | 8.7 |
| Dispersant | 6.2 |
| N-methyl pyrrolidone | 70.1 |
| Gray Coating Mixture | |
| propylene carbonate/PVF mix | 72.4 |
| R-960 white dispersion | 27.38 |
| Raven 16 black dispersion | 0.22 |

The gray coating mixture was cast onto the nacreous pigment film using a gravure coating method. The gray coating layer had a thickness of 6 mils (15.24 um). The film was dried using a three-zone oven with temperatures ranging from 330° F. (166° C.) to 400° F. (204° C.) for 45 seconds.

The fluoropolymer lamiante film structure was stripped from the carrier web by hand. The fluoropolymer laminate film structure was treated on the air side (e.g., the side formed away from the casting support substrate) using a Tesla coil from Electro Technic of Chicago, Ill. This corona treatment involved passing the coil less than 6 inches (15.24 centimeters) from the air side of the film thereby providing a surface which promotes adhesion when further coated or laminated. The fluoropolymer laminate film structure was subsequently coated on the black film side (or air side) with an acrylic adhesive and adhered to an aluminum sheet previously coated with a layer of white PVF film. The film laminate structure is adhered to the PVF side of the aluminum sheet.

Specular gloss was determined to be 84 at 60 degrees. After 6000 kilojoules energy (equated to approximately 5 years exposure in Florida facing south at 45°), the film had retained 60% of its initial gloss without any visible cracking.

Example 2B

A two layer film laminate structure containing aluminum flake was made and tested for weathering resistance.

First Layer A first clear layer of polyvinyl fluoride was made from a dispersion of 40 weight % PVF and propylene carbonate containing UV absorbers and no pigment. The uv absorbers were Tinuvin 440 amd Tinuvin 1130 available from Ciba Additives (Hawthorne, N.Y.). The dispersion was cast onto a glossy polyester film supplied by ICI Co. and known as Melinex 442 by use of a gravure coater. The coating was dried in a three-zone air-float oven with temperatures ranging between 410° F. (210° C.) and 340° F. (171°) for 36 seconds. The dry film was approximately 0.50 mils (12.7 um) thick.

Second Layer: A second layer containing 9 wt. % aluminum flake based on the total dry weight of fluoropolymer and pigment was prepared using the following procedure.

The polyvinyl fluoride aluminum flake layer was made by adding 6.2 wt. % aluminum flake (7160N available from Alcan-Toyo, Lockport, Ill.) to 93.3 wt. % of a 41% solids polyvinyl fluoride/N-methyl pyrrolidone dispersion. The materials were mixed using a Sharr Mixer and 0.4 wt. % of calcium carbonate (known as Multifex MM available from Seegott, Cleveland, Ohio) was added to the dispersion. This coating was cast using the same procedure as outlined for the pigment layer of Example 2A.

As in Example 2A The fluoropolymer laminate film structure was stripped from the carrier web by hand and treated using a corona discharge treater, coated with acrylic adhesive 68080, and adhered to aluminum sheet with a white layer of PVF film.

Specular gloss of the laminate construction was determined to be 94 at 60 degrees. The laminate construction was subjected to accelerated weathering in a xenon arc apparatus using test procedure SAE J1960. After 6000 kilojoules energy exposure, the film retained only 30% of its initial gloss and was visibly cracked.

Example 2C

In a similar accelerated weathering test, a commercially available graphic silver film with pressure sensitive adhesive (available from Gerber Scientific as P27359A) was laminated to aluminum sheet. Specular gloss of the laminate construction was determined to be 97 at 60 degreee degrees. The laminate construction was placed in a xenon arc artificial weathering apparatus using test procedure SAE J1960. After 2400 kilojoules, the sample had retained less than 10% of its initial 60 degree gloss.

What is claimed is:

1. A laminate film structure comprising at least two polymer layers, said layers comprising a top layer of a cast weatherable fluoropolymer containing about 1 to about 15% by weight nacreous pigment based on the total dry weight of fluoropolymer and pigment, said top layer having a thickness of about 4 $\mu$m to about 15 $\mu$m, said layers comprising an underlying layer of a polymer containing about 1 to about 20% by weight solid color pigment based on the total dry weight of polymer and pigment, said underlying layer being at least two times as thick as the top layer, said laminate film structure having a room temperature elongation greater than 100%.

2. The laminate film structure of claim 1 wherein the top layer further comprises a solid color pigment.

3. The laminate film structure of claim 1 wherein the fluoropolymer of the top layer comprises polyvinyl fluoride.

4. The laminate film structure of claim 1 wherein the polymer of the underlying layer comprises a fluoropolymer.

5. The laminate film structure of claim 4 wherein the polymer of the underlying layer comprises polyvinyl fluoride.

6. The laminate film structure of claim 1 wherein the top layer has a thickness of from about 5 $\mu$m to about 10 $\mu$m.

7. The laminate film structure of claim 1 retaining at least 50% of its 60 degree gloss after 6000 kJ exposure in an accelerated weathering device operated in accordance with SAE J1960.

8. The laminated film structure of claim 1 wherein said top layer contains about 1 to about 5% by weight nacreous pigment based on the total dry weight of fluoropolymer and pigment.

9. The laminate film structure of claim 1 adhered to a thermoplastic sheet material.

10. A shaped article having a 60 degree gloss greater than 70 and a DOI greater than 40 formed from the laminate film structure of claim 1 adhered to a thermoplastic sheet material.

11. A process for forming a laminate film the process comprising the steps of:
    a) preparing a first fluid composition of fluoropolymer resin comprising from about 0.5 to about 6.5% nacreous pigment based on the weight of the fluid composition,
    b) casting the first fluoropolymer fluid composition onto a support substrate;
    c) forming a coalesced first fluoropolymer film layer on the support substrate having a thickness of about 4 $\mu$m to about 15 $\mu$m;
    d) drying a coalesced first fluoropolymer film layer on the support substrate;
    e) preparing a second fluid composition of polymer resin containing from about 0.2 to about 10% solid color pigment based on the weight of the fluid composition;
    f) casting the second polymer fluid composition onto the first coalesced fluoropolymer film layer;
    g) forming a coalesced second polymer film on the first fluoropolymer layer to form a laminate film structure which second layer is at least two times as thick as the first layer;
    h) drying the laminate film structure while in contact with the support substrate; and
    i) removing the laminate film structure having a lustrous appearance on the support side from the support substrate.

12. The laminate film structure of claim 1 having a DOI of at least 67.

* * * * *